United States Patent
Tang et al.

[11] Patent Number: 6,019,954
[45] Date of Patent: *Feb. 1, 2000

[54] CATALYST AND PROCESS FOR THE CONVERSION OF CARBON MONOXIDE

[75] Inventors: Fushan Tang; Xintang Zhang; Qiuyun Zong; Yuxiu Wang; Yongfang Tan; Xin Li; Zhaoming Tian; Yanwei Yang, all of Zibo, China

[73] Assignees: China Petro-Chemical Corp; Qilu Pertrochemical Co., both of China

[ * ] Notice: This patent issued on a continued prosecution application filed under 37 CFR 1.53(d), and is subject to the twenty year patent term provisions of 35 U.S.C. 154(a)(2).

[21] Appl. No.: 08/698,208

[22] Filed: Aug. 14, 1996

Related U.S. Application Data

[62] Division of application No. 08/357,868, Dec. 16, 1994, abandoned.

[51] Int. Cl.[7] ................. B01J 23/02; C01B 3/16
[52] U.S. Cl. .................... 423/437.2; 423/656; 502/341
[58] Field of Search ................. 423/656, 437.2

[56] References Cited

U.S. PATENT DOCUMENTS

| | | | |
|---|---|---|---|
| 3,392,001 | 7/1968 | Lorenz et al. | 423/656 |
| 3,529,935 | 9/1970 | Lorenz et al. | 423/437 M |
| 3,850,840 | 11/1974 | Aldridge et al. | 423/656 |
| 4,128,505 | 12/1978 | Mikousky et al. | 252/465 |
| 4,142,988 | 3/1979 | Chinchen | 423/656 |
| 4,153,580 | 5/1979 | Hausberger et al. | 502/302 |
| 4,206,036 | 6/1980 | Takeuchi et al. | 208/89 |
| 4,233,180 | 11/1980 | Hausberger et al. | 252/373 |
| 4,320,100 | 3/1982 | Engelbrecht et al. | 423/656 |
| 4,465,790 | 8/1984 | Quayle | 502/309 |
| 4,537,873 | 8/1985 | Kato et al. | 502/242 |
| 4,613,584 | 9/1986 | Schneider et al. | 502/304 |
| 4,892,717 | 1/1990 | Hass | 423/656 |
| 5,096,688 | 3/1992 | Miller et al. | 423/656 |
| 5,204,309 | 4/1993 | Vorob'iev et al. | 502/306 |
| 5,229,347 | 7/1993 | Prada et al. | 502/221 |

FOREIGN PATENT DOCUMENTS

| | | |
|---|---|---|
| 062912 | 10/1982 | European Pat. Off. . |
| 189701 | 8/1986 | European Pat. Off. . |
| 2416351 | 10/1974 | Germany . |
| 1482721 | 5/1989 | U.S.S.R. . |

*Primary Examiner*—Wayne Langel
*Attorney, Agent, or Firm*—Merchant & Gould, P.C.

[57] ABSTRACT

Disclosed are a catalyst suitable for the conversion of carbon monoxide with steam into carbon dioxide and hydrogen, and a process therewith for said conversion. Said catalyst comprises Co, Ni, Mo and/or W active components, $TiO_2$-containing carrier and non-alkali metal element promoter(s). Said process comprises reacting carbon monoxide feed gas containing 0.01% or more of $H_2S$ by volume with steam in the presence of said catalyst at a temperature between 230 to 500° C. under a pressure between 0 to 10 MPa (absolute) with a relatively high yield, whereby heavy fuel can be used as a source of carbon monoxide feed gas for such a process.

12 Claims, No Drawings

CATALYST AND PROCESS FOR THE CONVERSION OF CARBON MONOXIDE

This is a divisional application of U.S. application Ser. No. 08/357,868, filed Dec. 16, 1994, abandoned, which application is incorporated herein by reference.

FIELD OF THE INVENTION

The present invention relates to a catalyst for the conversion of carbon monoxide with steam into carbon dioxide and hydrogen and a process therewith, in particular, to an alkali metal-free, sulfide-resistant, Co—Mo system catalyst supported over a $TiO_2$-containing carrier for the conversion of carbon monoxide with steam into carbon dioxide and hydrogen, which achieves good low-temperature activity and remains active and stable under low sulfide level, high steam partial pressure and high temperature condition, and a process therewith.

BACKGROUND OF THE INVENTION

The conversion of carbon monoxide with steam into carbon dioxide and hydrogen, known as the water-gas shift process, is extensively utilized in chemical and petrochemical industries, such as in the production of hydrogen, carbonyl compound and ammonia. This process is usually carried out in the presence of a catalyst to improve its efficiency. Among the known catalysts, the Fe—Cr system catalysts and Cu—Zn system catalysts are not competent due to their sensitiveness to sulfides and susceptibility to high-level sulfides and hence the quick reduction in shift activity in such a case, especially for carbon monoxide feed gases made from heavy oil, coal and residual oil, which usually contain various levels of sulfides. As an approach to overcome such problems, the Co—Mo system catalysts have been proposed, of which the active components are the oxides or sulfides of cobalt or nickel and molybdenum or tungsten, and the active components are usually supported over a carrier such as alumina or zirconia. These catalysts achieve good activity for the conversion of carbon monoxide feed gas containing higher level of sulfides.

However, the Co—Mo system catalysts have their maximum conversion activity in the sulphidized condition, so these catalysts require certain level of sulfides contained in the feed gas to keep them in a sulphidized state, and can not tolerate a feed gas of low level of sulfides. In fact, the concentration of sulfides in the gases to be converted does not affect the reaction and there is practically no upper limit to this concentration. Moreover, these catalysts display low activity at a lower reaction temperature (see U.S. Pat. No. 3,529,935). Addition of alkali metal can improve the low-temperature activity (see E.P. Application 062,912), though when the alkali metal-containing catalysts are used under low sulfide level, high steam partial pressure and high temperature condition, the phases of the active components and the carrier degrade, giving rise to the collapse of the structure and the inactivation of the catalyst. Further, during the conversion process, the alkali metal promoter migrates and leaves from the catalysts, deposits on the surface of the pipes and the equipment, and leads to the accumulation of chloride on such surfaces and eventually to equipment failure.

Obviously, there still exists a need for a catalyst for the conversion of carbon monoxide, which is free of alkali metal, active at a relatively low reaction temperature and can keep active and stable under low sulfide level, high steam partial pressure and high temperature condition, thus providing a conversion process with high performance.

SUMMARY OF THE INVENTION

Accordingly, it is an object of the present invention to provide a new catalyst for the conversion of carbon monoxide, which is active at a relatively low reaction temperature, free of alkali metal, stable under low sulfide level, high steam partial pressure and high temperature condition, and which displays good adaptability to high space velocity of feed gas as well as changes in sulfide content and steam/dry gas ratio in the carbon monoxide feed gas, and therefore can be applied in a wide range, i.e, can be effectively used for the conversion of various carbon monoxide feed gas containing different levels of sulfides at different temperatures and space velocities under different steam partial pressures.

It is another object of the present invention to provide a process for the conversion of carbon monoxide with steam into carbon dioxide and hydrogen in the presence of the catalyst of the present invention, which is carried out at a temperature between 230 and 500° C., under a pressure between 0 and 10 MPa (absolute), with a carbon monoxide feed gas having a sulfide content of 0.01% by volume or more.

The inventors have made deep and extensive investigation on this process and the nature of such catalyst, and unexpectedly found that by the use of the $TiO_2$-containing carrier, and optionally non-alkali metal promoters, a new highly active, alkali metal-free Co—Mo system catalyst for the conversion of carbon monoxide can be provided, said catalyst comprising by weight, a. a carrier having $TiO_2$, optionally with MgO and/or $Al_2O_3$;

b. at least one catalytically active metal compound selected from the group consisting of oxides and sulfides of Co, Ni, Mo and W; and optionally c. promoter(s) selected from the group consisting of compounds of rare earth elements, alkali earth metals, Cu, Zn and Mn.

Said catalyst is prepared by the process comprising a) first slurrying the magnesium oxide or magnesium hydroxide with deionized water to give a slurry, and then adding the resultant slurry to a solution of aluminium nitrate or other soluble aluminium salts in water to give a mixture;

b) precipitating the mixture with an alkaline precipitant at a pH between 7 and 12 while stirring at a temperature between 10 and 90° C., then filtrating and collecting the solid, washing with deionized water until the wash water is a neutral pH to provide a cake;

c) slurrying the resultant cake with a solution of ammonium molybdate, ammonium tungstate, soluble cobalt salts and/or soluble nickel salts to give a mixture;

d) adding promoter compound(s) to the mixture obtained in step c), then adding metatitanic acid and/or titanium dioxide, and mixing them thoroughly to give a homogeneous mixture; or impregnating the cake obtained in step b) with a solution of salts of active component(s) and promoter(s), then mixing thoroughly with metatitanic acid and/or titanium dioxide to give a homogeneous mixture; and e) drying the homogeneous mixture at 100–120° C., pulverizing, sieving, mixing with conventional shaping additives, then molding the mixture into pellets, and finally calcinating at a temperature between 450 and 600° C. for a period of time between 1 and 5 hours to provide a finished catalyst.

In the presence of the catalyst of the present invention, different composition of carbon monoxide feed gas can be catalytically converted with steam into carbon dioxide and hydrogen with a relatively high yield even at a relatively low reaction temperature, and moreover, during the reaction, the catalyst can keep active and stable even under low sulfide level, high steam partial pressure and high temperature condition.

DETAILED DESCRIPTION OF THE INVENTION

To prepare the present catalyst, as raw material, commercially available magnesium oxide, preferably light magnesia, or magnesium hydroxide and commercially available titanium dioxide or metatitanic acid can be used, any materials that can be treated to give $TiO_2$ and MgO can also be used, and there is no particular restriction on the process for producing these materials. Surface areas of these materials are critical for determinating the catalytic activity. For activity in the carbon monoxide conversion, the surface area of these materials is usually 40–130 $m^2/g$.

As the sources of Al, Co, Ni and promoter elements, various soluble salts of the corresponding elements can be used, such as nitrate, chloride, sulphate, etc, with nitrates being preferred. As the Mo and W source, ammonium molybdate and ammonium tungstate are preferably used.

As shaping additives, conventionally used shaping additives can be used, e.g., carboxymethylcellulose.

To produce a catalyst according to the present invention, the salts of Co or Ni and Mo or W is added in such an amount that the molar ratio between cobalt or nickel and molybdenum or tungsten is preferably from 0.1:1 to 2.5:1. When MgO and $Al_2O_3$ is utilized, the carrier is preferably prepared in such a way that the molar ratios of MgO to $Al_2O_3$, MgO to $TiO_2$ and $TiO_2$ to $Al_2O_3$ are from 0.3:1 to 10:1, from 1.0:1 to 20:1 and from 0.05:1 to 2.0:1 respectively. The promoter elements optionally used in the present invention are rare earth elements, alkali earth metals, Mn, Zn and Cu, preferably rare earth elements, more preferably La and Ce in a ratio of La:Ce=1:9 to 9:1.

The catalyst of the present invention preferably comprises, by weight, 1.0 to 97.0% of $TiO_2$, 0 to 40.0% of MgO and 0 to 80.0% of $Al_2O_3$.

The catalyst of the present invention preferably comprises, by weight, 1.0 to 10.0% of oxide and/or sulfide of Co, and 2.0 to 20.0% of oxide and/or sulfide of Mo.

The catalyst of the present invention preferably comprises, by weight, 0 to 10.0% of promoter selected from oxides of rare earth elements.

Preferably, the catalyst of the present invention comprises 5.0 to 97.0% by weight of $TiO_2$.

To prepare the catalyst of the present invention, various changes and modifications can be made without departing from the scope of the invention as set forth in the appended claims.

The catalyst prepared according to the present invention has its maximum activity in the sulphidized condition. To convert the catalyst into the sulphidized condition, the catalyst is treated with a gas stream containing a certain level of sulfides at a temperature between 200 and 250° C. The sulphidization of the catalyst is easier than that of prior art catalysts.

As used herein, the term "dry gas" refers to the carbon monoxide feed gas without added steam, while the term "wet gas" refers to the carbon monoxide feed gas consisting of dry gas and steam.

As used herein, the term "shift" means the CO conversion process.

To evaluate the catalyst of the present invention for its performance for the conversion of carbon monoxide with steam, the catalyst prepared according to the present invention, optionally diluted with Φ4 mm alumina pellets, is loaded into a Φ45×5 mm electrically-heated stainless steel tubular reactor equipped with an axially oriented Φ8×2 mm thermocouple well. The gas stream is introduced into the reactor via an upper inlet, passed through the catalyst bed, sulphidizing the catalyst and/or undergoing conversion over the catalyst, then leaves the reactor via an outlet at the reactor bottom. The unreacted steam in the produced gas stream is condensed and separated off, while the dry produced gas is metered and passed to a gas chromatograph for analysis of its composition or discharged into the atmosphere. The process is in general carried out at a temperature of 230° C. to 500° C.

The activity of the catalyst of the present invention is expressed in terms of CO conversion, which is defined according to the following formula $$CO\ conversion(\%) = \frac{moles\ of\ CO\ converted}{moles\ of\ CO\ introduced} \times 100$$

The catalyst prepared according to the present invention is further tested in an industrial-scale reactor, to determine its performance under reaction condition in an industrial scale. During the process, the catalyst is optionally extracted from the reactor at specified time for evaluation of its physical properties, e.g., surface area, pore volume, and crush strength.

The results obtained from the tests mentioned above show that the catalyst prepared according to the present invention, compared with known industrially utilized catalysts, achieves better activity within the temperature tested at a sulfide level of 0.01% or more by volume contained in the carbon monoxide feed gas, and is less susceptible to the changes of steam/dry gas ratio and space velocity of the carbon monoxide feed gas. Accordingly the catalyst of the present invention allows the carbon monoxide conversion process to make the use of higher space velocities and consequently, smaller reactors are possible. The activity of the catalyst of the present invention remains practically constant for long on-stream periods. The catalyst of the present invention undergoes little or no change as regards its structure and surface area. The carbon monoxide conversion reaction in the presence of the catalyst of the present invention may be advantageously carried out at superatmospheric pressure, e.g. 0 to 10 MPa (absolute).

Without intending to be limited by any known theory, it is believed that the unexpectedly good performance of the catalyst of the present invention results from the use of the carrier and the promoter according to the present invention.

The present invention will be described in more detail by the following non-limiting examples.

EXAMPLE

Comparative Example 1

919 g of $Al(NO_3)_3 \cdot 9H_2O$ (or corresponding equivalents of $Al(OH)_3$ dissolved in $HNO_3$) is dissolved in 2000 ml deionized water to give a solution, to which is added 63 g of light magnesia (MgO content being 74.3 wt %) previously slurried homogeneously in 500 ml of deionized water, then slowly added ammonia under 50° C. at pH=8 to initiate precipitation. The solid is filtered and collected, washed with deionized water until free from $NO_3$, the resultant cake is slurried at room temperature to give a slurry. To this is added 100 g of 24.5 wt % solution of $(NH_4)_6 Mo_7O_{24} \cdot 4H_2O$ in water and 100 g of 31.1 wt % solution of $Co(NO_3)_2 \cdot 6H_2O$ in water. The ingredients are mixed and slurried homogeneously to give a mixture, which is then dried at a 110° C., pulverized and passed through 100 mesh screen to give a crude product. The crude product is mixed with carboxymethylcellulose in an ratio of 1.5 wt % with respect to the crude product weight, stirred and kneaded to form plastic mass, which is molded into Φ4 mm pellets. The pellets are allowed to dry at 110° C., then calcinated at 500° C. for 4 h to provide the finished catalyst, whose composition corresponds to that of the catalyst prepared in Example D, U.S. Pat. No. 3,529,935, designated as comparative catalyst A.

Example 1

The catalyst (catalyst B) is prepared as in comparative example 1, except that the amount of $Al(NO_3)_3 \cdot 9H_2O$ used is 872 g, and 7.5 g of $TiO_2$ powder is added prior to the addition of $Co(NO_3)_2 \cdot 6H_2O$ solution.

Example 2

The catalyst (catalyst C) is prepared as in example 1, except that the amount of $TiO_2$ used is 15 g and the amount of $Al(NO_3)_3 \cdot 9H_2O$ used is 810 g.

Example 3

The catalyst (catalyst D) is prepared as in example 1, except that the amount of $TiO_2$ used is 30 g and the amount of $Al(NO_3)_3 \cdot 9H_2O$ used is 626 g.

Example 4

The catalyst (catalyst E) is prepared as in example 1, except that the amount of $Al(NO_3)_3 \cdot 9H_2O$ used is 464 g and the amount of $TiO_2$ used is 62 g.

Example 5

The catalyst (catalyst F) is prepared as in comparative example 1, except that 172 g of $TiO_2$ is used instead of $Al(NO_3)_3 \cdot 9H_2O$ and light magnesia.

Example 6

The catalyst (catalyst G) is prepared as in comparative example 1, except that the concentration of $Co(NO_3)_2 \cdot 6H_2O$ solution is 27.2 wt %, and this solution additionally contains 4.0 wt % of $La(NO_3)_3 \cdot 6H_2O$ and 4.0 wt % of $Ce(NO_3)_3 \cdot 6H_2O$.

Example 7

The catalyst (catalyst H) is prepared as in example 2, except that the amount of light magnesia used is 68.7 g and the $Co(NO_3)_2 \cdot 6H_2O$ solution additionally contains 4.0 wt % of $La(NO_3)_3 \cdot 6H_2O$ and 4.0 wt % of $Ce(NO_3)_3 \cdot 6H_2O$.

Comparative Example 2

This catalyst is an industrially used catalyst, available from BASF, Germany, with the designation of K8-11.

Normal Pressure Test

The catalysts prepared in the above examples and the comparative catalysts are evaluated under normal pressure for their characteristic activity, defined as the conversion of carbon monoxide under normal pressure, the result are listed in table I.

Test Conditions

| dry gas composition by volume, % | | | | |
|---|---|---|---|---|
| CO | $CO_2$ | $CH_4$ | $H_2S$ | $H_2$ |
| 40–50 | 0–5.0 | 0.25–0.40 | 0.3–0.4 | balance |

| | |
|---|---|
| amount of catalyst loaded | 0.3 g(40–60 mesh) |
| space velocity of dry gas | 10000 $h^{-1}$ |
| steam/dry gas ratio | 1.0 |
| sulphidizing temperature | 250° C. |
| sulphidizing time | 4 h |

TABLE 1

| Example NO. | Catalyst | Catalyst composition, wt % | | | | | | | characteristic activity, % | | |
|---|---|---|---|---|---|---|---|---|---|---|---|
| | | $Al_2O_3$ | MgO | $TiO_2$ | CoO | $MoO_3$ | $La_2O_3$ | $Ce_2O_3$ | 250° C. | 350° C. | 450° C. |
| comparative 1 | comparative A | 62.56 | 23.43 | | 4.01 | 10.00 | | | 0.75 | 3.82 | 25.26 |
| 1 | B | 59.04 | 23.30 | 3.73 | 3.98 | 9.95 | | | 0.93 | 4.02 | 27.32 |
| 2 | C | 55.09 | 23.41 | 7.50 | 4.01 | 9.99 | | | 1.10 | 4.60 | 34.58 |
| 3 | D | 44.83 | 24.65 | 15.80 | 4.20 | 10.52 | | | 1.20 | 6.27 | 39.46 |
| 4 | E | 31.57 | 23.41 | 31.02 | 4.00 | 10.00 | | | 1.26 | 8.32 | 46.61 |
| 5 | F | | | 86.00 | 4.00 | 10.00 | | | 1.45 | 11.41 | 58.5 |
| 6 | G | 61.93 | 23.20 | | 3.47 | 9.90 | 0.75 | 0.75 | 1.13 | 4.65 | 32.80 |
| 7 | H | 53.17 | 24.63 | 7.24 | 3.86 | 9.64 | 0.73 | 0.73 | 1.33 | 7.96 | 40.77 |
| comparative 2 | $K_{8-11}$ | | | | | | | | 0.72 | 3.61 | 21.24 |

It can be seen from table I that the characteristic activity of the catalyst increases with the content of $TiO_2$ in the catalyst, moreover, the presence of rare earth elements, e.g., La and Ce also enhances the characteristic activity of the catalyst.

Catalyst H and the industrially utilized catalyst K8-11 were tested under various condition for their activities, the results are shown in table IIa, IIb, IIc.

TABLE IIa

| Catalyst | CO Conversion, % | | Sulphidizing condition* |
|---|---|---|---|
| | steam/dry gas ratio of 1.2 | steam/dry gas ratio of 1.4 | |
| H | 72.88 | 71.27 | cat. 100 ml Φ4 × 4 mm. |
| $K_{8-11}$ | 57.70 | 39.96 | 20 MPa, 250° C., 20 h, 2000 $h^{-1}$(dry gas) | feed gas composition by volume, %
CO        $CO_2$    $CH_4$       $H_2S$      $H_2$
40~50    0~5.0    0.25~0.40   0.3~0.4    balance Table IIa shows the results obtained with sulphidizing gas stream of different steam/dry gas ratio, from which it can be seen that the activity of the catalyst of the present invention is slightly affected by the steam/dry gas ratio of the sulphidizing gas stream, while the activity of catalyst K8-11 is seriously affected. Moreover, the catalyst of the present invention is easier to sulphidize compared with catalyst K8-11.

After sulphidized as above, the catalysts are tested with feed gas stream of different steam/dry gas ratio, the results are given in table IIb. Table IIb shows that the catalyst of the present invention is not so seriously affected as the catalyst K8-11 by steam/dry gas ratio of the feed gas stream.

TABLE IIb

| Catalyst | CO content at outlet, v% steam/dry gas ratio | | | Test conditions* |
|---|---|---|---|---|
| | 1.0 | 1.2 | 1.4 | |
| H | 1.96 | 1.17 | 1.66 | cat. 100 ml, Φ4 × 4 mm. |
| $K_{8-11}$ | 4.14 | 2.39 | 2.03 | inlet temp. 310° C. 8.2 MPa, 3000 $h^{-1}$(dry gas) | feed gas composition by volume, %
CO        $CO_2$    $CH_4$       $H_2S$      $H_2$
40~50    0~5.0    0.25~0.40   0.3~0.4    balance With alternating the space velocity of feed gas, the CO content by volume at the outlet is measured, the results are given in table IIc.

TABLE IIc

| Catalyst | CO content at outlet, v% dry gas space velocity, $h^{-1}$ | | | Test conditions* |
|---|---|---|---|---|
| | 1000 | 2000 | 3000 | |
| H | 1.03 | 1.15 | 1.17 | cat. 100 ml, Φ4 × 4 mm. |
| $K_{8-11}$ | 1.08 | 1.39 | 2.39 | inlet temp. 310° C. 8.2 MPa, steam/dry gas ratio 1.2 | feed gas composition by volume, %
CO        $CO_2$    $CH_4$       $H_2S$      $H_2$
40~50    0~5.0    0.25~0.40   0.3~0.4    balance From table IIc, it can be noted that the change in space velocity of the feed gas brings about less effect upon the activity of the catalyst of the present invention than upon the catalyst K8-11.

In a word, the catalyst of the present invention is less susceptible to the changes in steam/dry gas ratio of the gas stream and to the changes in space velocity of dry gas than the industrially used catalyst K8-11.

The catalyst H and K8-11 are tested with a feed gas stream containing a low level of sulfides, about 0.01~0.03% by volume of $H_2S$. The results are shown in table III. Under such condition, catalyst H appears more active than catalyst K8-11, especially at lower inlet temperatures.

TABLE III

| Inlet temp., °C. | Time, h | Catalyst H | | Catalyst $K_{8-11}$ | | Test conditions* |
|---|---|---|---|---|---|---|
| | | outlet temp., °C. | CO conversion, % | outlet temp., °C. | CO conversion, % | |
| 310 | 20 | 278 | 95.9 | 301 | 86.26 | cat. 100 ml, |
| 350 | 20 | 290 | 96.5 | 297 | 86.72 | Φ4 × 4 mm, |
| 450 | 60 | 303 | 93.8 | 338 | 91.50 | diluted with 1:1 $Al_2O_3$. 8.2 MPa, steam/dry gas ratio 1.2, 3000 $h^{-1}$ (dry gas). | feed gas composition by volume, %
CO        $CO_2$    $CH_4$       $H_2S$      $H_2$
40~50    0~5.0    0.25~0.40   0.3~0.4    balance To determine its stability, the catalyst H was subjected to a 1020 h continuous test under conditions indicated as in table IIa, IIb. The results are given in table IV. Table IV reveals that under the same sulphidizing condition at 250° C., catalyst H displays higher activity than catalyst K8-11, which means the former is easy to sulphidize and possesses higher low-temperature activity. After various a period of time of conversion reaction, catalytic activity of catalyst H decreases only slightly, while that of catalyst K8-11 decreases more. Returning to a lower reaction temperature, catalyst H appears ever more active than catalyst K8-11.

TABLE IV

| | | Catalyst H | | Catalyst K$_{8-11}$ | |
|---|---|---|---|---|---|
| Inlet temp., °C. | Time of running | outlet temp., °C. | CO conversion, % | outlet temp., °C. | CO conversion, % |
| Sulphidizing 250 | 24 | 254 | 72.88 | 256 | 57.70 |
| shift 285 | 240 | 285 | 96.63 | 301 | 95.63 |
| 310 | 240 | 296 | 96.45 | 320 | 92.32 |
| 350 | 200 | 319 | 94.84 | 337 | 91.13 |
| 400 | 200 | 339 | 93.17 | 339 | 91.16 |
| 450 | 80 | 354 | 92.93 | 343 | 91.25 |
| 310 | 20 | 322 | 92.38 | 302 | 87.60 |

The catalyst H and K8-11 are tested in an industrial-scale reactor for 86 days with a carbon monoxide feed gas made from residual oil with low level of sulfide, then the catalyst is extracted from the reactor and is evaluated for physical properties, the results are listed in table Va and Vb.

| Test conditions | |
|---|---|
| volume of catalyst loaded | 75 l, Φ4 × 8–12 mm |
| sulphidizing: | |
| temperature | 200~250° C. |
| time | 40 h |
| steam/dry gas ratio | 1.4 |
| dry gas stream composition by volume | |
| CO    CO$_2$    N$_2$ + Ar    CH$_4$    H$_2$S    H$_2$ | |
| 43.5 ±    6.0 ±    0.55 ±    1.2 ±    0.02 ±    balance | |
| 1.0%    0.5%    0.05%    0.2%    0.01% | |

TABLE Va

| flowrate of wet gas*, m³/h | inlet temp., °C. | outlet temp., °C. | CO conversion % |
|---|---|---|---|
| Catalyst H | | | |
| 530 | 294 | 425 | 80.96 |
| 562 | 307 | 444 | 80.08 |
| 590 | 317 | 453 | 78.69 |
| 537 | 330 | 473 | 81.90 |
| Catalyst K$_{8-11}$ | | | |
| 536 | 306 | 394 | 63.36 |
| 525 | 318 | 435 | 75.29 |
| 536 | 330 | 455 | 80.45 |

*dry gas space velocity, 3000 h$^{-1}$

From table Va, it is can be seen that when the inlet temperature is set between 294~330° C., the outlet temperature varies from 425~480° C. for catalyst H, which displays relatively high activity, the drop in inlet temperature does not bring about a substantial decrease in activity of catalyst H, while the activity of catalyst K8-11 decreases with the drop of inlet temperature. That means catalyst H is more active and stable than catalyst K8-11 under such conditions i.e. suitable for application at high temperature, low sulfide level and high steam partial pressure.

TABLE Vb

| | Catalyst H | | | Catalyst K$_{8-11}$ | | |
|---|---|---|---|---|---|---|
| Item | before use | after use | loss | before use | after use | loss |
| strength, N/cm | 158 | 94.2 | 41.4% | 156 | 32.4 | 79% |
| pore volume, ml/g | 0.241 | 0.274 | −14% | 0.361 | 0.438 | −21% |
| surface area, m²/g | 45.9 | 37.5 | 18.3% | 133.7 | 45.91 | 65.6% |

Table Vb shows that the catalyst of the present invention remains more stable than catalyst K8-11 in an industrial-scale reactor.

Although the present invention has been described with reference to the above-mentioned examples, those skilled in the art will understand that various changes and modifications can be made in the details of the invention as described herein without departing from the spirit of the invention as set forth in the appended claims, these changes and modifications are all within the scope of the present invention.

What is claimed is:

1. A process for conversion of carbon monoxide with steam into carbon dioxide and hydrogen, comprising reacting a carbon monoxide-containing feed gas with steam with a catalyst comprising:

a) a carrier comprising $TiO_2$, MgO, and $Al_2O_3$, wherein the molar ratio of MgO to $TiO_2$ is from 23.41/31.02:1 to 20:1, the molar ratio of $TiO_2$ to $Al_2O_3$ is from 0.05:1 to 2.0:1 and the molar ratio of MgO to $Al_2O_3$ is from 0.3:1 to 10:1; and b) a catalytically active metal compound selected from the group consisting of oxides and sulfides of Co and Ni, and at least one compound selected from the group consisting of oxides and sulfides of Mo and W;

wherein said catalyst is free of alkali metal.

2. wherein said catalyst is prepared by a process including:

1) slurrying the magnesium oxide or magnesium hydroxide with deionized water to form a slurry, and then adding the slurry to a solution of aluminum nitrate or other soluble aluminum salts in water to form a mixture;

2) precipitating the mixture with alkaline precipitant under a pH between 7 and 12 while stirring at a temperature between 10–90° C., then filtrating and collecting the solid, washing with deionized water to neutral to form a cake;

3) slurrying the cake with a solution of ammonium molybdate, ammonium tungstate, soluble cobalt salts and/or soluble nickel salts to form a second mixture;

4)
   i) adding promoter compound(s) to the second mixture, then adding metatitanic acid and/or titanium dioxide and mixing to form a homogeneous mixture; or
   ii) impregnating the cake with a solution of salts of active component(s) and promoter(s), then mixing with metatitanic acid and/or titanium dioxide to form a homogeneous mixture; and 5) drying the homogeneous mixture at 100–120° C., pulverizing, sieving, mixing with a shaping additive, molding into pellets, and calcinating at a temperature between 450–600° C. for a period of time between 1 and 5 hours to provide a finished catalyst.

3. The process according to claim 1 or 2, wherein the catalyst comprises 1–10 wt-% of an oxide of Co, sulfide of Co, or combination thereof, all calculated as CoO; and 2–20 wt-% of an oxide of Mo, sulfide of Mo, or combination thereof, all calculated as $MoO_3$, based on the total weight of the catalyst.

4. The process according to claim 1 or 2, wherein the catalyst further comprises 0–10.0 wt-% of promoter selected from oxides of rare earth elements, based on the weight of the catalyst.

5. The process according to claim molar ratio of La to Ce of 1:9 to 9:1.

6. The process according to claim 1 or 2, wherein said carrier comprises metatitanic acid as the source of $TiO_2$.

7. The process according to claim 5, wherein said carrier comprises metatitanic acid as the source of $TiO_2$.

8. The process according to claim 1 or 2, wherein the feed gas comprises 40–50% by volume CO and 0.01% or more by volume $H_2S$.

9. The process according to claim 5, wherein the feed gas comprises 40–50% by volume CO and 0.01% or more by volume $H_2S$.

10. The process according to claim 7, wherein the feed gas comprises 40–50% by volume CO and 0.01% or more by volume $H_2S$.

11. The process according to claim 1 or 2, wherein the reaction is carried out at a temperature of 230–500° C.

12. The process according to claim 1 or 2, wherein the reaction is carried out at a pressure of 0–10 MPa (absolute).

* * * * *